Figure 2:
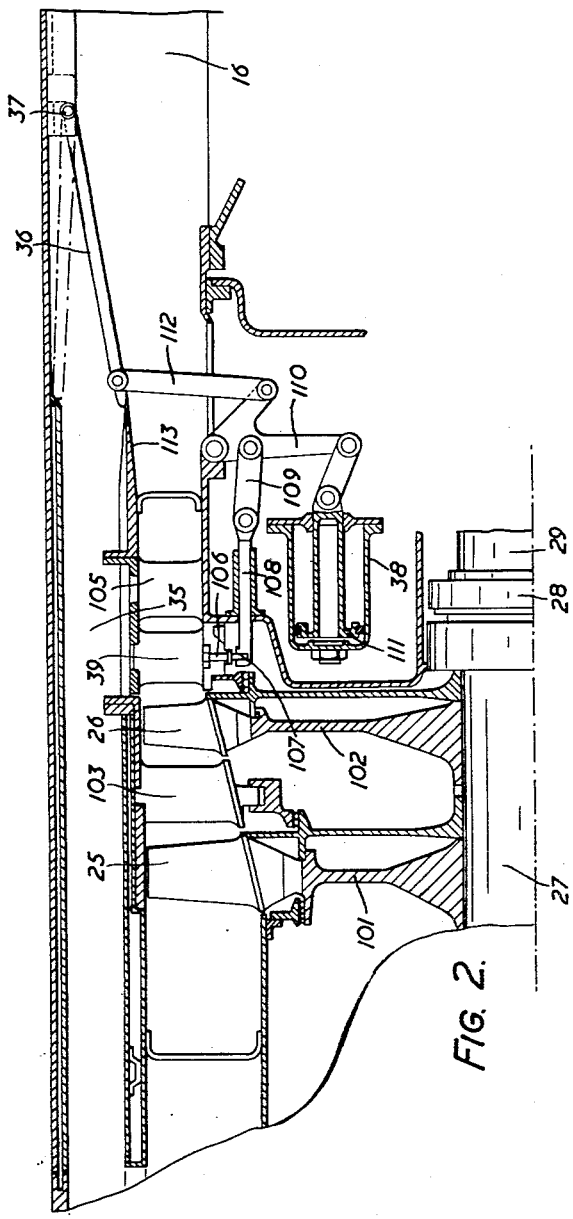

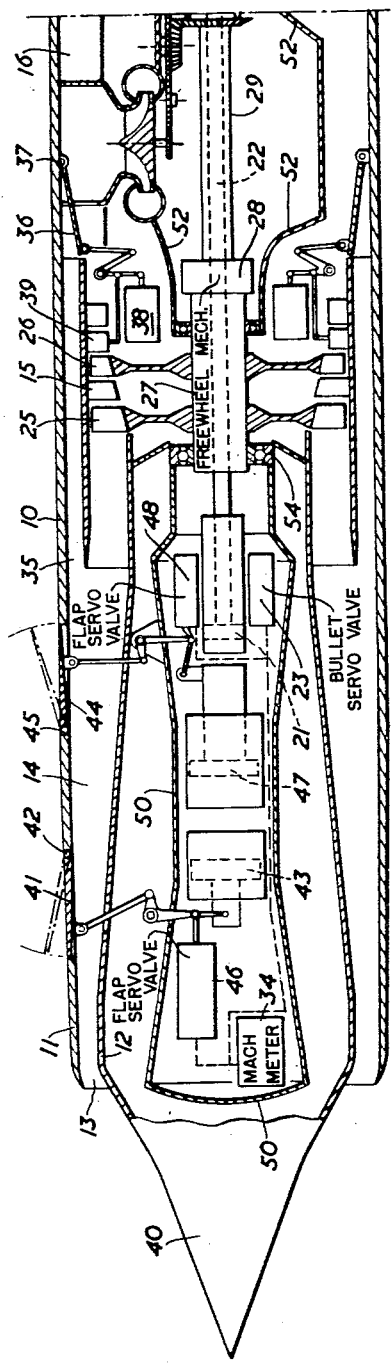
FIG. IA.
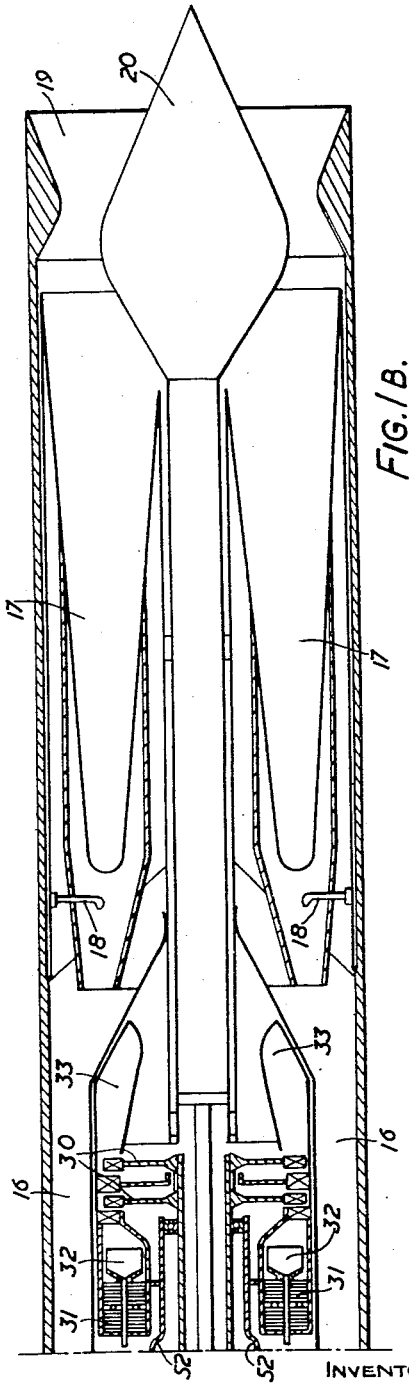
FIG. IB.
INVENTORS
R.E. MORRIS, G.F. UPTON
A.L. DAVIES, A.L.R. FLETCHER.
BY Watson, Cole, Grindle + Watson
ATTORNEY INVENTORS
R.E. MORRIS, G.F. UPTON
A.L. DAVIES, A.L.R. FLETCHER
BY
Watson, Cole, Grindle + Watson
ATTORNEYS

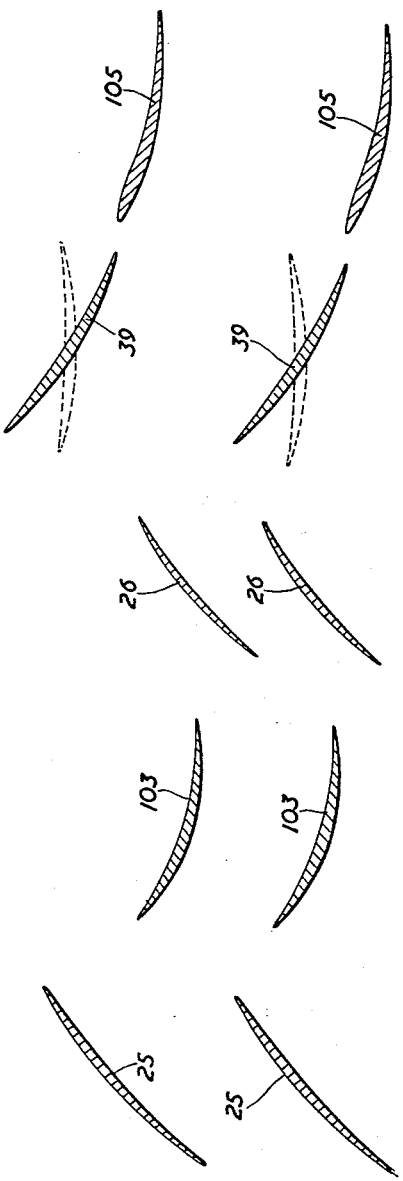

2,995,893
COMPOUND RAMJET-TURBOROCKET ENGINE
Ronald E. Morris, George Frank Upton, Alan L. Davies, and Alan L. R. Fletcher, London, England, assignors to D. Napier & Son Limited, London, England, a British company
Filed June 13, 1958, Ser. No. 741,936
Claims priority, application Great Britain July 3, 1957
2 Claims. (Cl. 60—35.6)

This invention relates to axial flow compressors required to operate in two main conditions, in one of which the compressor is driven in the normal manner, while in the other condition the compressor is not driven, but it is required to pass the maximum amount of fluid through the compressor at the minimum pressure drop. The invention is applicable in particular to multi-stage compressors.

According to the invention a multi-stage axial flow compressor includes at least two rings of rotor blades and at least two rings of stator blades respectively downstream thereof, the downstream ring of stator blades being adjustable, each blade on a pivotal axis which is substantially radial to the axis of rotation of the compressor, and including adjusting mechanism arranged to pivot each blade of this downstream ring into one or other of the two operating positions, in one of which the blade ring operates at maximum efficiency as a normal stator blade ring, while in the other position the blades are positioned to give the maximum effective throat area between blades.

Where the invention is applied to a multi-stage axial flow compressor a satisfactory improvement in the flow through the compressor can be achieved simply by adjusting the pitch of the blades of the downstream stator ring, all upstream stator blade rings being fixed. It is also unnecessary for practical purposes to alter the pitch of the rotor blades and any such alteration of the pitch of the rotor blades would involve extremely complicated mechanism. According to a preferred feature of the invention therefore all stator and rotor blade rings upstream of the adjustable stator blade ring are fixed and non-adjustable.

The invention is particularly applicable to a compressor forming part of a jet propulsion unit of the compounded ramjet turborocket type and according to another aspect of the invention an aircraft propulsion engine of this type comprises a rocket motor arranged to drive a turbine coupled to the compressor, to deliver air to a main combustion chamber at relatively low forward flight speeds, the compressor being allowed to windmill with the turbo-rocket section of the engine out of operation when the forward flight speed is sufficiently high to provide the necessary ram effect for pure ramjet operation, the compressor including an adjustable ring of stator blades as specified above.

The compressor preferably includes a by-pass passage by which additional air can be supplied to the main combustion chamber from the air intake of the compressor without passing through the compressor working passages during the ramjet regime.

Moreover according to a preferred feature of the invention the compressor includes valve means controlling the air flow through the by-pass duct and operating mechanism therefor, this operating mechanism being connected to the operating mechanism for the adjustable stator blades of the compressor to work in unison therewith.

The invention may be performed in various different ways but one specific embodiment will now be described by way of example with reference to the accompanying drawings in which FIGURES 1A and 1B together form a sectional side elevation of a compound ramjet turborocket engine.

FIGURE 2 is a sectional side elevation on an enlarged scale of the compressor included therein; and FIGURE 3 is a diagrammatic developed sectional view of the compressor blading.

This engine is a compounded ramjet-turborocket engine. It includes an outer generally cylindrical casing 10, the front end 11 of which forms with a conical centre body 12 an annular air intake 13 leading to an axial diffuser passage 14 and then to an axial flow compressor 15 from which the air passes rearwardly through an annular air duct 16 into an annular combustion chamber 17 to which a hydrocarbon fuel such as kerosene is supplied through burners 18. The hot products of combustion issue through a nozzle 19 at the rear of the engine as a high speed propulsion jet. A bullet 20 is provided for adjusting the area of the nozzle, this bullet being axially movable by a hydraulic ram 21 disposed in the front part of the engine and connected to the bullet by a long shaft 22 extending rearwardly through the centre of the engine. The ram 21 is controlled by a follow-up servo valve 23.

The compressor comprises two rotor blade rings 25, 26 mounted on a hollow shaft 27 which is connected by a freewheel mechanism 28 to another hollow shaft 29 at the downstream end of which is mounted a two stage axial flow turbine 30. This turbine is driven by a rocket system including catalytic decomposition chambers 31 to which hydrogen peroxide is supplied and decomposed to form oxygen-rich steam, and rocket combustion chambers 32 into which some paraffin is then introduced for combustion with some of the oxygen. The combustion products are expanded in the turbine 30, and then pass through ducts 33 to enter the main combustion chamber 17 along with the air from the said annular duct 16, to contribute to the propulsive effect of the jet.

Provision is also made for the engine to operate as a pure ramjet when a sufficiently high speed has been reached. For this purpose an annular by-pass duct 35 is provided around the axial flow compressor 15, and the downstream end of this by-pass duct communicates through flap valves 36, pivoted at 37, with the said annular air duct 16 at the downstream end of the compressor. These flap valves 36 are actuated by hydraulic servo-motors 38 which also actuate a ring of adjustable stator blades 39 for the last stage of the compressor, to increase the flow through the compressor and reduce losses therein during ramjet operation. At a predetermined Mach number when the ram effect alone will provide sufficient compression of the air, and which is sensed by a Mach meter indicated generally at 34, the hydrogen peroxide and paraffin supply to the rocket system can be arranged to be shut off automatically or by pilot selection is automatically shut off, thus stopping the turbine 30 and removing the power supply for the axial flow compressor 15. At the same time the by-pass flap valves 36 are opened to allow air from the air intake 13 to pass through the annular by-pass duct 35 to the combustion chamber 17. The free wheel mechanism 28 between the turbine 30 and the axial flow compressor 15 permits the latter to "windmill" during ramjet operation.

The centre body 12 has a conical nose tip 40, and cooperates with the outer cowl 11 to provide shock compression during ramjet operation. Behind the lip of the cowl at the beginning of the diffuser section 14 there is an annular port providing communication between the outside of the engine and the diffuser section. During ramjet operation this port is closed by a series of petal type flaps 41 pivotally attached to the outer shell of the engine at their rear ends 42. During turbo-rocket operation below Mach .95 approximately these flaps are swung outwards as shown in chain lines by a hydraulic servomotor 43 controlled by a follow-up servo valve 46, so as to provide an additional annular air intake of larger diameter surrounding the main air intake 13.

Towards the rear end of the diffuser section 14 and upstream of the axial flow compressor 15 there is arranged another series of similar pivoted flaps 44 controlling another annular port in the outer shell 11 which constitutes a controllable spill port which is opened to the extent required to maintain the desired shock pattern at the intake. These flaps 44 are pivotally connected to the shell at their upstream ends 45 and are opened outwards by a hydraulic servomotor 47 controlled by a follow-up servo valve 48.

Thermally insulated compartments are provided in the engine within the annular air duct through the engine. There is a front compartment 50 lying mainly within the diffuser section 14 and terminating adjacent the forward end of the compressor 15. This compartment houses the hydraulic servomotors 43, 47 which are connected through mechanical linkages with the said two series of flaps 41 and 44, and their control valves 46, 48. It also houses the Mach meter 34 and the shock sensing system, a forward bearing 54 for the axial flow compressor 15, and the hydraulic ram 21 for adjusting the position of the nozzle bullet 20.

A second insulated compartment 52 surrounds the shaft 29 connecting the turbine to the compressor and encloses the freewheel mechanism 28, pumps for lubricant, servomotor fluid, paraffin and hydrogen peroxide, gearing for driving these pumps and other auxiliaries. This compartment also contains a sump of lubricating oil, two heat exchangers through which paraffin fuel is pumped in succession as a coolant and a metering unit for the paraffin and hydrogen peroxide.

The compressor 15 itself is of the two stage type including the two rotor blade rings 25, 26 mounted on rotor discs 101, 102, attached to the compressor shaft 27. Between the rotor blade rings there is mounted a ring of stator blades 103 which are angularly fixed and non-adjustable. Downstream of the second rotor blade ring 26 there is mounted a second ring of stator blades 39 which are each angularly adjustable about axes through each blade which are radial to the main axis of the compressor. A further series of fixed straightener vanes 105 is provided downstream of the second adjustable stator blade ring 39.

The blades 39 are each connected rigidly to a pin 106 capable of rotating in a bushing carried by a fixed part of the engine and the inner end of this pin is connected to an off-set crank 107 which is in turn connected through pivoted links 108 and 109 to a point on a bell crank lever 110 which is angularly adjustable by means of the double acting servo ram 38. The ram comprises a ram piston 111 connected to a piston rod passing through a gland at one end of the ram cylinder and means are also provided for admitting pressure fluid to either end of the ram cylinder as required under the control of an automatic servo valve. The servo valve itself forms no part of the present invention and will not therefore be described in detail. The hydraulic servo ram 38 is also arranged to actuate the flap valves 36. To this end the bell crank lever 110 is connected through a pivoted link 112 to a point at the upstream end of each flap valve. In the position illustrated the upstream end of the flap valve abuts against a cylindrical shield 113 which separates the by-pass passage 35 from the outlet passage of the compressor, both these passages communicating at their downstream ends with the annular air passage 16. In this position the flap valve 36 closes the by-pass passage 35 and air can only pass into the passage 16 via the compressor. In the other operative position of the flap valve 36 as illustrated in chain lines the by-pass passage 35 is opened to the passage 16 and air can then flow through the compressor and through the by-pass passage.

In operation when the rocket turbine 30 is driving the compressor 15 the servo ram piston 111 is in the position illustrated and the flap valve 36 is closed preventing air flow through the by-pass passage, and the second row of stator blades 39 are in the position indicated in full lines in FIGURE 3. The compressor thus delivers air to the main combustion chamber 17 and operates normally at full efficiency.

When the engine has attained a forward flight velocity at which the ram pressure is sufficient to support combustion the supply of fuel to the rocket engine driving the turbine is shut off automatically or by the pilot selection and the turbine stops. At the same time the servo valve automatically reverses the high pressure connections to the ram cylinder 38 and the ram piston is moved to the right in FIGURE 2 thus opening the flap valves 36 so that the by-pass passage 35 allows air to flow around the compressor into the air passage 16, and at the same time the adjustable stator blades 39 are rotated into their second operative positions as indicated in chain lines in FIGURE 3. In this position of the blades the maximum throat area is achieved with the minimum resistance to flow and the turbine rotor blade rings 25, 26 will windmill under the air flowing through the compressor thus augmenting the total air flow into the main combustion chambers 17.

The servo valve controlling actuation of the ram 38 may be arranged to be responsive to the speed of rotation of the turbine. Thus at all turbine speeds above a predetermined figure the servo valve will be arranged to hold the ram piston 111 in the position illustrated, while when the turbine speed falls below this value as a result of the fuel supply being shut off to this rocket combustion chambers the ram piston will move into its alternative operative position.

What we claim as our invention and desire to secure by Letters Patent is:

1. A compound ramjet-turborocket engine, comprising a ramjet engine, a turbine, a rocket motor in driving relation with said turbine, a compressor, a main combustion chamber communicating with and receiving air from said compressor at relatively low forward flight speeds, passage means for supplying air to the main combustion chamber during the ramjet engine operation, a free wheel clutch interconnecting the compressor and turbine and permitting the compressor to overrun the turbine, the compressor being of the multi-stage axial flow type and including at least two rings of rotor blades and at least two rings of stator blades each downstream of one of the rotor blade rings, each blade of the downstream ring of stator blades being adjustable, on a pivotal axis which is substantially radial to the axis of rotation of the compressor, and including an adjusting mechanism arranged to pivot each blade of this downstream ring selectively into one or another of two operating positions, in one of which the blade ring operates at maximum efficiency as a normal stator blade ring, while in the other position the blades are positioned to give the maximum effective throat area between the stator blades.

2. A compound ramjet-turborocket engine, comprising a ramjet engine, a turbine, a rocket motor in driving relation with said turbine, a compressor, a main combustion chamber communicating with and receiving air from said compressor at relatively low forward flight speeds, a freewheel clutch interconnecting the compressor and turbine and permitting the compressor to overrun the turbine, the compressor being of the multi-stage axial flow type and including at least two rings of rotor blades and at least two rings of stator blades each downstream of one of the rotor blade rings, each blade of the downstream ring of stator blades being adjustable, on a pivotal axis which is substantially radial to the axis of rotation of the compressor, and including an adjusting mechanism arranged to pivot each blade of this downstream ring selectively into one or another of two operating positions, in one of which the blade ring operates at maximum efficiency as a normal stator blade ring, while in the other position the blades are positioned to give the maximum effective throat area between the stator blades, said engine including a by-pass passage by which air can be supplied to the main combustion chamber from the air intake of the engine without passing through the compressor during the ramjet operation, and including valve means controlling the air flow through the by-pass passage and an operating mechanism therefor, said operating mechanism being connected to the adjusting mechanism for the adjustable stator blades of the compressor to work in unison therewith.

References Cited in the file of this patent

UNITED STATES PATENTS

| | | |
|---|---|---|
| 2,596,435 | Robert | May 13, 1952 |
| 2,696,078 | Waitzman | Dec. 7, 1954 |
| 2,857,092 | Campbell | Oct. 21, 1958 |
| 2,857,740 | Hall et al. | Oct. 28, 1958 |